United States Patent
Chang et al.

(10) Patent No.: US 11,411,636 B2
(45) Date of Patent: *Aug. 9, 2022

(54) METHOD FOR WIDEBAND SHORT-RANGE WIRELESS COMMUNICATION USING A DIRECTIONAL ANTENNA

(71) Applicant: ELECTRONICS AND TELECOMMUNICATIONS RESEARCH INSTITUTE, Daejeon (KR)

(72) Inventors: Kap Seok Chang, Daejeon (KR); Hyoung Jin Kwon, Daejeon (KR); Sung Geun Jin, Daejeon (KR); Yong Sun Kim, Daejeon (KR); Seung Eun Hong, Daejeon (KR); Woo Yong Lee, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,030

(22) Filed: Sep. 15, 2020

(65) Prior Publication Data

US 2021/0013958 A1 Jan. 14, 2021

Related U.S. Application Data

(63) Continuation of application No. 16/450,943, filed on Jun. 24, 2019, now Pat. No. 10,812,175, which is a
(Continued)

(30) Foreign Application Priority Data

Feb. 16, 2010 (KR) .................. 10-2010-0013894
Feb. 23, 2010 (KR) .................. 10-2010-0016180
(Continued)

(51) Int. Cl.
*H04B 7/155* (2006.01)
*H04W 72/12* (2009.01)
(Continued)

(52) U.S. Cl.
CPC ......... *H04B 7/15592* (2013.01); *H04B 7/155* (2013.01); *H04W 24/08* (2013.01);
(Continued)

(58) Field of Classification Search
CPC .. H04B 7/15592; H04B 7/155; H04B 7/0426; H04W 24/08; H04W 72/085;
(Continued)

(56) References Cited

U.S. PATENT DOCUMENTS 5,673,252 A 9/1997 Johnson et al.
8,139,512 B2 3/2012 Charbit et al.
(Continued)

FOREIGN PATENT DOCUMENTS

JP 2008219554 A 9/2008
KR 20080031652 A 4/2008
(Continued)

OTHER PUBLICATIONS

A Comparative Study of Wireless Protocols, Lee et al., 2007.
Cooperation in Wireless Sensor Networks, Gokturk et al., 2008.

*Primary Examiner* — Afshawn M Towfighi
(74) *Attorney, Agent, or Firm* — Rabin & Berdo, P.C.

(57) ABSTRACT

Provided is an apparatus and method for wideband short-range wireless communication using a directional antenna in a millimeter wave band, and the method for wideband short-range wireless communication according to an embodiment may determine a first time interval and a second time interval for a cooperated data frame transfer based on a packet transmission time at each transmission from a source node to a destination node, transmit a frame
(Continued)

to a relay node through an antenna pattern directed towards the relay node at a start point of the first time interval, and transmit the frame to the destination node through an antenna pattern directed towards the destination node after a predetermined period of time from a start point of the second time interval.

17 Claims, 15 Drawing Sheets

Related U.S. Application Data continuation of application No. 14/306,149, filed on Jun. 16, 2014, now Pat. No. 10,361,770, which is a continuation of application No. 13/579,031, filed as application No. PCT/KR2011/001007 on Feb. 16, 2011, now Pat. No. 8,792,378.

(30) Foreign Application Priority Data

| Feb. 24, 2010 | (KR) | ................. 10-2010-0016507 |
| Jun. 7, 2010 | (KR) | ................. 10-2010-0053268 |
| Feb. 15, 2011 | (KR) | ................. 10-2011-0013201 |

(51) Int. Cl.
*H04W 24/08* (2009.01)
*H04W 72/08* (2009.01)
*H04W 84/04* (2009.01)
*H04W 74/04* (2009.01)

(52) U.S. Cl.
CPC ..... *H04W 72/085* (2013.01); *H04W 72/1205* (2013.01); *H04W 74/04* (2013.01); *H04W 84/047* (2013.01)

(58) Field of Classification Search
CPC ............. H04W 72/1205; H04W 74/04; H04W 84/047; H04W 40/22
See application file for complete search history.

(56) References Cited

U.S. PATENT DOCUMENTS

| 8,175,003 | B2 | 5/2012 | Panwar et al. |
| 8,351,847 | B2 | 1/2013 | Lee |
| 8,363,744 | B2 | 1/2013 | Agee et al. |
| 2003/0198206 | A1 | 10/2003 | Cain et al. |
| 2004/0095907 | A1 | 5/2004 | Agee et al. |
| 2004/0196834 | A1* | 10/2004 | Ofek ................... H01Q 21/065 370/352 |
| 2005/0075140 | A1 | 4/2005 | Famolari |
| 2006/0035676 | A1 | 2/2006 | Sayers et al. |
| 2006/0050742 | A1* | 3/2006 | Grandhi ................... H04B 7/02 370/506 |
| 2006/0066484 | A1 | 3/2006 | Sayers |
| 2006/0077942 | A1 | 4/2006 | Panwar et al. |
| 2006/0092871 | A1 | 5/2006 | Nishibayashi et al. |
| 2006/0109814 | A1 | 5/2006 | Kuzminskiy et al. |
| 2007/0060157 | A1 | 3/2007 | Gopalakrishnan et al. |
| 2007/0150928 | A1* | 6/2007 | Hottinen ............... H04B 7/155 725/127 |
| 2008/0045212 | A1* | 2/2008 | Kim ..................... H04W 28/18 455/435.1 |
| 2008/0049658 | A1 | 2/2008 | Asai et al. |
| 2008/0056175 | A1 | 3/2008 | Jung et al. |
| 2008/0085677 | A1 | 4/2008 | Sheen et al. |
| 2008/0137585 | A1 | 6/2008 | Loyola et al. |
| 2008/0219229 | A1 | 9/2008 | Zheng |
| 2008/0285480 | A1 | 11/2008 | Panwar et al. |
| 2008/0298474 | A1 | 12/2008 | Charbit et al. |
| 2009/0017752 | A1* | 1/2009 | Lee ....................... H04L 1/0002 455/9 |
| 2009/0046613 | A1 | 2/2009 | Gaur |
| 2009/0052463 | A1 | 2/2009 | Chen et al. |
| 2009/0175214 | A1 | 7/2009 | Star et al. |
| 2009/0238132 | A1* | 9/2009 | Nabetani ............... H04W 56/00 370/329 |
| 2009/0252100 | A1 | 10/2009 | Sridhara et al. |
| 2009/0262678 | A1 | 10/2009 | Oyman et al. |
| 2009/0279481 | A1 | 11/2009 | Vidal et al. |
| 2009/0290528 | A1 | 11/2009 | Kwon et al. |
| 2010/0061272 | A1 | 3/2010 | Veillette |
| 2010/0142435 | A1 | 6/2010 | Kim et al. |
| 2010/0226349 | A1 | 9/2010 | Matsuo et al. |
| 2010/0317284 | A1 | 12/2010 | Charbit et al. |
| 2010/0331028 | A1 | 12/2010 | Cordeiro et al. |
| 2011/0128912 | A1 | 6/2011 | Katayama et al. |
| 2011/0141968 | A1* | 6/2011 | Trainin .................. H04L 1/007 370/328 |
| 2011/0142108 | A1 | 6/2011 | Agee et al. |
| 2011/0205969 | A1 | 8/2011 | Ahmad et al. |
| 2012/0320763 | A1 | 12/2012 | Hong et al. |
| 2015/0142382 | A1* | 5/2015 | Osagawa ............... G04R 20/00 702/176 |

FOREIGN PATENT DOCUMENTS

| KR | 20080054422 A | 6/2008 |
| KR | 20090122133 A | 11/2009 |
| KR | 20090125803 A | 12/2009 |
| WO | 2009011531 A2 | 1/2009 |
| WO | 2009078768 A1 | 6/2009 |

* cited by examiner

METHOD FOR WIDEBAND SHORT-RANGE WIRELESS COMMUNICATION USING A DIRECTIONAL ANTENNA

CROSS REFERENCE TO RELATED APPLICATIONS

This is a continuation of U.S. application Ser. No. 16/450,943 filed on Jun. 24, 2019, and allowed on Jun. 16, 2020, which is a continuation of Ser. No. 14/306,149, filed on Jun. 16, 2014 (issued on Jul. 23, 2019 as U.S. Pat. No. 10,361,770), which is a continuation of Ser. No. 13/579,031, filed on Aug. 14, 2012 (issued on Jul. 29, 2014 as U.S. Pat. No. 8,792,378), which is a national phase application of PCT application No. PCT/KR2011/001007, filed on Feb. 16, 2011, the subject matter of which is incorporated herein by reference. Further, these applications are based upon and claims the benefit of priority of the prior Korean Patent Application No. 10-2010-0013894, filed on Feb. 16, 2010, No. 10-2010-0016180, filed on Feb. 23, 2010, No. 10-2010-0016507, filed on Feb. 24, 2010, No. 10-2010-0053268, filed on Jun. 7, 2010, and No. 10-2011-0013201, filed on Feb. 15, 2011, the entire contents of which are incorporated herein by reference.

TECHNICAL FIELD

The present invention relates to an apparatus and method for wideband short-range wireless communication using a directional antenna in a millimeter wave band, and more particularly, relates to an apparatus and method for relaying a communication signal when using a directional antenna in a wireless system supporting a reservation-based channel access such as a Wireless Local Area Network (WLAN) or a Wireless Personal Area Network (WPAN).

BACKGROUND ART

A millimeter wave band corresponding to 57 to 66 GHz may ease a worldwide shortage of frequency resources.

A millimeter wave has unique properties of a short wavelength, a high frequency, a wideband, and a large amount of exchange with atmospheric components. The millimeter wave has merits of a high data transmission rate obtained by using an ultra wideband, a high resistance against interference in proximity due to a high straightness, an excellent security, an easiness of reusing a frequency, and the like. A short wavelength of the millimeter wave may enable various devices to be miniaturized and less weighted.

In contrast, the millimeter wave has demerits of a short propagation length due to an absorption by an oxygen molecule and due to a phenomenon of rain attenuation, and a line of sight may be secured due to a characteristic of straightness.

To make up for the demerits of the millimeter wave, a directional antenna may be used. The directional antenna may concentrate power in a predetermined direction to enhance an efficiency of an antenna gain, thereby extending a communication range. However, even though the directional antenna is used, when the line of sight is not secured, an attenuation loss of a signal may be great due to a transmission length of the signal, a reflection of the signal, and a penetration through a barrier of the signal.

Accordingly, a technology may be used to perform a communication while minimizing an attenuation loss of a signal even when the line of sight is not secured.

DISCLOSURE OF INVENTION

Technical Goals

An aspect of the present invention provides an apparatus and method for enlarging a communication length by using both of a relay link, using a relay node for a communication between a source node and a destination node, and a direct link between the source node and the destination node in a wireless system supporting a reservation-based channel access.

Another aspect of the present invention provides an apparatus and method for performing a stable communication by using a relay link even when a direct link has a problem.

Still another aspect of the present invention provides an apparatus and method for transmitting data at a high transmission rate by causing a source node, a relay node, and a destination node to perform a communication using a directional antenna.

Technical Solutions

According to an aspect of the present invention, there is provided a method for wideband short-range wireless communication, the method including determining a first time interval and a second time interval for a cooperated data frame transfer based on a packet transmission time at each transmission from a source node to a destination node, transmitting a frame to a relay node through an antenna pattern directed towards the relay node at a start point of the first time interval, and transmitting the frame to the destination node through an antenna pattern directed towards the destination node after a predetermined period of time from a start point of the second time interval.

The first time interval may be determined based on a period of time during which the source node transmits the frame to the relay node, and the second time interval may be determined based on a predetermined period of time, a period of time during which the relay node transmits a frame received from the source node to the destination node, a period of time during which the source node transmits the frame to the destination node, a short inter-frame space (SIFS), and a period of time during which the destination node transmits an acknowledgment (ACK) frame to the source node.

The first time interval may be repeated within an assigned service period, and repeated first time intervals may be determined to be the same value or different values, and the second time interval may be repeated within an assigned service period, and repeated second time intervals may be determined to be the same value or different values.

The method may further include requesting an access point (AP) or a Personal basic service set Control Point (PCP) for an assignment of a resource corresponding to a service period, and receiving the assignment of the service period from the AP or the PCP.

The requesting may include requesting the assignment of the service period using, as a start signal, a signal indicating a successful transmission time point adjustment when the source node transmits a frame and a successful transmission time point adjustment when the relay node transmits a frame.

The method may further include receiving an ACK frame indicating the frame is received from the destination node within the second time interval.

The method may further include measuring a quality of a link between the source node and the relay node, a quality of a link between the relay node and the destination node, and a quality of a link between the source node and the destination node, wherein the determining includes determining the first time interval and the second time interval based on information about the quality of a link between the source node and the relay node, information about the quality of a link between the relay node and the destination node, and information about the quality of a link between the source node and the destination node.

The method may further include transmitting information about the measured qualities of links to the AP or the PCP, and receiving, from the AP or the PCP, a further assignment of a resource based on the information about the measured qualities of links.

The measuring may include receiving, from the relay node, the information about the quality of a link between the source node and the relay node and the information about the quality of a link between the relay node and the destination node.

The AP or the PCP may transmit information about the assignment of a resource, for each direction and based on a period of time, through a beam pattern formed in all directions of the AP or the PCP.

The transmitting of a frame to the relay node may include setting a medium access control (MAC) address of the source node to a transmitter address of an MAC header, setting an MAC address of the destination node to a receiver address of the MAC header, and transmitting the frame.

The predetermined period of time may correspond to a sum of a preset period of time and a propagation delay time occurring at a transmission from the source node to the relay node.

The method may further include receiving an ACK frame from the relay node after a predetermined period of time and an SIFS from the start point of the first time interval, wherein the transmitting of a frame to the relay node includes transmitting the frame for the predetermined period of time.

The method may further include receiving an ACK frame from the destination node and receiving an ACK frame from the relay node after an SIFS is passed after a transmission of the frame to the destination node is completed within the second time interval.

The transmitting of a frame to the destination node may include transmitting the frame by setting an MAC address of the relay node to a transmitter address of an MAC header after an SIFS passes from a start point of the second time interval.

The method may further include receiving an immediate-ACK frame from the destination node by the relay node within the second time interval, and receiving an immediate-ACK frame from the destination node within the SIFS and receiving a relay ACK frame from the relay node.

The method may further include receiving a block-ACK frame from the destination node by the relay node within the second time interval, and receiving a block-ACK frame from the destination node within the SIFS and receiving a relay block-ACK frame from the relay node.

The transmitting of a frame to the destination node may include transmitting the frame by setting an MAC address of the source node to a transmitter address of an MAC header after an SIFS passes from a start point of the second time interval.

The method may further include receiving an immediate-ACK frame from the destination node after an SIFS passes after a transmission of the frame to the destination is completed within the second time interval, and receiving the relay ACK frame from the relay node after the SIFS passes after the relay node receives a relay ACK frame from the destination node.

The method may further include receiving a block-ACK frame from the destination node after an SIFS passes after a transmission of the frame to the destination is completed within the second time interval, and receiving the relay block-ACK frame from the relay node after an SIFS passes after the relay node receives a relay block-ACK frame from the destination node.

According to an aspect of the present invention, there is provided a method for wideband short-range wireless communication, the method including receiving a frame from a source node through an antenna pattern directed towards the source node during a first time interval determined based on a packet transmission time at each transmission from the source node to a destination node in a service period assigned from an AP or a PCP, and transmitting the received frame to the destination node through an antenna pattern directed towards the destination node after a predetermined period of time from a start point of a second time interval determined based on a packet transmission time at each transmission from the source node to the destination node.

The predetermined period of time may correspond to a sum of a preset period of time and a period of time obtained by subtracting a propagation delay time, occurring at a transmission from the destination node to the relay node, from a propagation delay time, occurring at a transmission from the destination node to the source node.

The relay node may operate by a half-duplex scheme to receive the frame from the source node, and transmits the received frame to the destination node.

The transmitting may include setting a MAC address of the source node to a transmitter address of an MAC header, setting an MAC address of the destination node to a receiver address of the MAC header, and transmitting the received frame.

The method may further include transmitting an ACK frame to the source node after a predetermined period of time and an SIFS from the start point of the first time interval, wherein the receiving of a frame includes receiving the frame from the source node for the predetermined period of time.

The method may further include receiving an ACK frame from the destination node and transmitting the received ACK frame to the source node after an SIFS is passed after a transmission of the received frame to the destination node is completed within the second time interval.

The method may further include measuring a quality of a link between the source node and the relay node and a quality of a link between the relay node and the destination node, and transmitting, to the source node, information about the quality of a link between the source node and the relay node and information about the quality of a link between the relay node and the destination node.

According to an aspect of the present invention, there is provided a method for wideband short-range wireless communication, the method including, when a first time interval and a second time interval determined based on a packet transmission time at each transmission from the source node to a destination node in a service period assigned from an access point (AP) or a Personal basic service set Control Point (PCP), simultaneously receiving a frame transmitted from a source node and a frame, transmitted from a relay node and corresponding to the same frame as the frame transmitted from the source node, through an antenna pattern directed towards the relay node and the source node after a predetermined period of time from a start point of the second time interval, and transmitting, to the source node through the antenna pattern directed to the source node, an ACK frame indicating a reception of the frame within the second time interval.

According to an aspect of the present invention, there is provided an apparatus for wideband short-range wireless communication, the apparatus including a control unit to determine a first time interval and a second time interval for a cooperated data frame transfer based on a packet transmission time at each transmission from a source node to a destination node, and a transmitter to transmit a frame to a relay node through an antenna pattern directed towards the relay node at a start point of the first time interval, and to transmit the frame to the destination node through an antenna pattern directed towards the destination node after a predetermined period of time from a start point of the second time interval.

The apparatus may further include a resource assignment requesting unit to request an AP or a PCP for an assignment of a resource corresponding to a service period, and to receive the assignment of the service period from the AP or the PCP.

The apparatus may further include a receiver to receive an ACK frame, indicating a reception of the frame, from the destination node within the second time interval.

The apparatus may further include a link quality measuring unit to measure a quality of a link between the source node and the relay node, a quality of a link between the relay node and the destination node, and a quality of a link between the source node and the destination node, wherein the control unit determines the first time interval and the second time interval based on information about the quality of a link between the source node and the relay node, information about the quality of a link between the relay node and the destination node, and information about the quality of a link between the source node and the destination node.

The transmitter may set an MAC address of the source node to a transmitter address of an MAC header, set an MAC address of the destination node to a receiver address of the MAC header, and transmit the frame to the relay node.

The predetermined period of time may correspond to a sum of a preset period of time and a propagation delay time occurring at a transmission from the source node to the relay node.

The receiver may receive, from the relay node, information about the quality of a link between the source node and the relay node and information about the quality of a link between the relay node and the destination node, and the control unit may change a modulation and coding scheme used for transmitting a frame from the relay node to the destination node based on the information about the quality of a link between the source node and the relay node and the information about the quality of a link between the relay node and the destination node.

In response to a completion of the cooperated data frame transfer, the transmitter may transmit a Relay Link Setup Teardown frame to the relay node, the destination node, and an AP or a PCP of a network performing a relay link setup.

The destination node may be set to enable an antenna pattern to be simultaneously directed to the relay node and the source node during the second time interval.

According to the present invention, a communication length may be enlarged by using both of a relay link, using a relay node for a communication between a source node and a destination node, and a direct link between the source node and the destination node in a wireless system supporting a reservation-based channel access.

According to the present invention, an apparatus and method may be provided to perform a stable communication by using a relay link even when a direct link has a problem.

According to the present invention, an apparatus and method may be provided to transmit data at a high transmission rate by causing a source node, a relay node, and a destination node to perform a communication using a directional antenna.

BEST MODE FOR CARRYING OUT THE INVENTION

Figure 1:
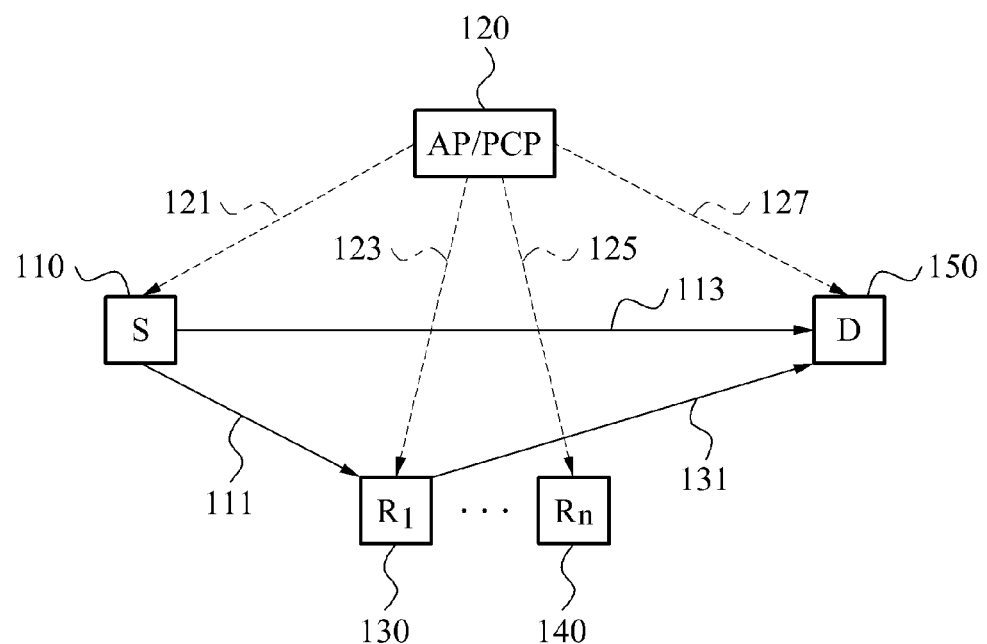
FIG. 1 is a diagram illustrating an apparatus for a wideband short-range wireless communication system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

In a Wireless Local Area Network (WLAN) and a Wireless Personal Area Network (WPAN), a scheme may be used to transmit data in a contentious and non-contentious manner. An Access Point (AP) or a Personal basic service set Control Point (PCP) of the WLAN and a Pico-Net Coordinator (PNC) of the WPAN may classify a time region for transmitting data into a contentious period and a non-contentious period.

In the contentious period, all devices in a network may be in contention based on a Carrier Sense Multiple Access/Collision Avoidance (CSMA/CA) to acquire a channel.

In the non-contentious period, the AP, PCP, or PNC may use a polling scheme or a scheme of transmitting scheduling information to cause a predetermined terminal in a network to transmit data in a predetermined time region in the non-contentious period.

The present invention provides an apparatus and method to cause a source node, a relay node, and a destination node to transmit and receive data and control information in the non-contentious period through a direct link between the source node and the destination node and a relay link connecting the source node, the relay node, and the destination node.

In the description below, the source node may indicate a node or a terminal starting a transmission of a frame. The relay node may indicate a node or a terminal receiving a frame transmitted from the source node and transmitting the received frame to the destination node. The destination node may correspond to a node being a target where the source node is to transmit frames, and may indicate a node or a terminal simultaneously receiving a frame transmitted from the source node and a frame transmitted from the relay node. In this instance, a frame may include a manager frame, a data frame, and a control frame.

FIG. 1 is a diagram illustrating an apparatus for a wideband short-range wireless communication system according to an embodiment of the present invention.

A source node 110 may request an AP/PCP 120 for information about available relay nodes 130 and 140 used for performing a link cooperation in a relation between a destination node 150 and the source node 110, and may acquire the information. Hereinafter, the AP/PCP 120 may indicate one of an AP and a PCP in a system where the present invention is applied.

In this instance, the AP/PCP 120 may transfer the information about the relay nodes 130 and 140 to the destination node 150. The link cooperation indicates a scheme transmitting the same frame using a direct link between the source node 110 and the destination node 150 and a relay link connecting the source node 110, the relay node 130 or 140, and the destination node 150.

The source node 110 may determine the relay node 130 or 140 to perform a link cooperation based on information about a channel status between the source node 110 and the relay node 130 or 140 and information about a channel status between destination node 150 and the relay node 130 or 140 acquired from the relay nodes 130 and 140.

When the relay node 130 or 140 to perform a link cooperation is determined, the source node 110 may perform a communication with the determined relay node 130 or 140 and the destination node 150 to set up a relay link connecting the source node 110, the relay node 130 or 140, and the destination node 150. The source node 110 may inform the AP/PCP 120 that the relay link is set up.

To perform a link cooperation among the source node 110, the relay node 130 or 140, and the destination node 150, a Transmission Time-Point Adjustment (TPA) procedure may be successfully performed.

The TPA procedure may correspond to a procedure adjusting a frame transmission time point of the source node 110 and the relay node 130 or 140 to enable a frame transmitted from the source node 110 and a frame transmitted from the relay node 130 or 140 to be received in the destination node 150 simultaneously or within a cyclic prefix. The frame transmission time point may be adjusted based on a propagation delay time occurring at a transmission between the source node 110 and the relay node 130 or 140, a propagation delay time occurring at a transmission between the destination node 150 and the source node 110, and a propagation delay time occurring at a transmission between the destination node 150 and the relay node 130 or 140.

During a TPA process, a beam may be formed using a directional antenna among the source node 110, the relay node 130 or 140, and the destination node 150. The TPA process may include a frequency offset adjusting process of the source node 110 and the relay node 130 or 140.

Referring to FIG. 1, in response to a reception of an action frame, indicating that the TPA process is successfully completed among the source node 110, the relay node 130 or 140, and the destination node 150, from the destination node 150, the source node 110 may request the AP/PCP 120 for an assignment of a resource. In this instance, the resource may include a service period.

As illustrated by dotted arrows 121, 123, 125, and 127, the AP/PCP 120 may transmit information about the assignment of a resource, for each direction and based on a period of time, through a beam pattern formed in all directions of the AP/PCP 120. The AP/PCP 120 may broadcast the information about the resource to be assigned in all directions in proximity to the AP/PCP 120.

The AP/PCP 120 may transmit the information about a resource to be assigned by varying, based on a period of time, a direction of a beam pattern generated to cover all directions in proximity to the AP/PCP 120. Transmit the information about a resource to be assigned by varying, based on a period of time, a direction of a beam pattern generated to cover all directions in proximity to the AP/PCP 120 is called Quasi-omni broadcasting scheme.

Thus, as illustrated by dotted arrows 121, 123, 125, and 127, the source node 110, the relay node 130 or 140, and the destination node 150 may receive the information about the assigned resource from the AP/PCP 120 in a similar scheme described above.

The information about the assigned resource may correspond to information about the service period, and may include information about a period for transmitting and receiving data among the source node 110, the relay node 130 or 140, and the destination node 150 in a predetermined time region of a non-contentious period.

In the assigned service period, the source node 110 may transmit a frame to the relay node 130 or 140 as illustrated by an arrow 111, and transmit the same frame to the destination node 150 as illustrated by an arrow 113. The relay node 130 or 140 may transmit the frame, received from the source node 110, to the destination node 150. The source node 110 may transmit a frame to the destination node 150 though a direct link, and may transmit the same frame once more to the destination node 150 through a relay link. The destination node 150 may acquire a chance of receiving the same frame twice and thus, more stably receiving a frame from the source node 110.

Since frames received in the destination node 150 may reach the destination node 150 at the same time point, transmission time points may be different between a frame transmitted from the source node 110 as illustrated by the arrow 113 and a frame transmitted from the relay node 130 or 140 as illustrated by an arrow 131.

Transmission time point of frames transmitted from the source node 110 and the relay node 130 or 140 may be further described with reference to FIG. 2.

Since the source node 110, the relay node 130 or 140, and the destination node 150 may transmit and receive frames using a directional antenna, the source node 110, the relay node 130 or 140, and the destination node 150 may also transmit and receive frames using an antenna pattern formed in the TPA process.

Figure 2:
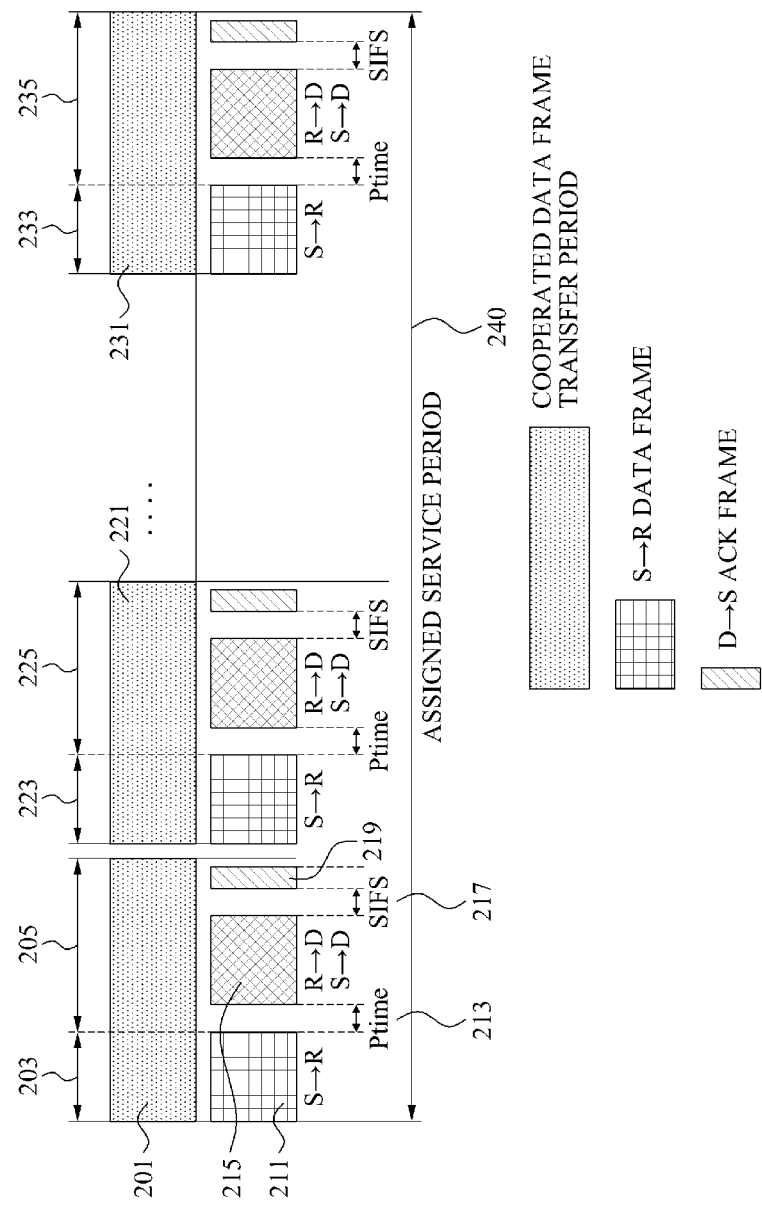
FIG. 2 is a diagram illustrating a mechanism of a method for wideband short-range wireless communication according to an embodiment of the present invention.

FIG. 2 is a diagram illustrating a mechanism of a method for wideband short-range wireless communication according to an embodiment of the present invention.

The source node 110 may transmit a frame to the relay node 130 or 140 prior to the destination node 150 to enable a frame transmitted through a relay link and a frame transmitted through a direct link to reach the destination node 150 at the same time point. Thus, to perform a cooperated data frame transfer, the source node 110 may determine a start point, when a frame is transmitted to the relay node 130 or 140, and a start point, when a frame is transmitted to the destination node 150, to be different from each other. The cooperated data frame transfer and a link cooperation may have the same meaning.

Referring to FIG. 2, in a service period 240 assigned from the AP/PCP 120, the source node 110 may determine a time interval 203 and a time interval 205 for the cooperated data frame transfer. In this instance, the source node 110 may determine the time interval 203 and the time interval 205 based on a packet transmission time at each transmission from the source node 110 to the destination node 150 through a direct link and a relay link. The time interval 203 and the time interval 205 may be included in a cooperated data frame transfer period 201.

The time interval 203 may correspond to an interval when the source node 110 transmits a data frame 211 to the relay node 130 or 140. A portion of time interval 205 may correspond to an interval 215 when the source node 110 and the relay node 130 or 140 transmit a data frame to the destination node 150.

In this instance, the time interval 205 may include a predetermined period of time 213, a short inter-frame space (SIFS) 217, and a transmission period during which an acknowledgment (ACK) frame 219 is transmitted from the destination node 150 to the source node 110. The destination node 150 may transmit the ACK frame to report that a data frame is received from the source node 110 and the relay node 130 or 140.

The time interval 205 may include a propagation delay time occurring at a transmission from the source node 110 to the relay node 130 or 140 and a propagation delay time occurring at a transmission from the destination node 150 to the relay node 130 or 140 to enable the destination node 150 to simultaneously receive a frame transmitted from the source node 110 and a frame transmitted from the relay node 130 or 140.

To transmit a different data frame to the destination node 150 within the assigned service period 240, the source node 110 may determine a time interval 223 and a time interval 225, and may exchange a data frame with the relay node 130 or 140 and the destination node 150. The time interval 223 and the time interval 225 may be included in a cooperated data frame transfer period 221.

To repeatedly transmit a different data frame to the destination node 150 until the assigned service period 240 ends, the source node 110 may determine a time interval 223 and a time interval 225, and may exchange a data frame with the relay node 130 or 140 and the destination node 150. The time interval 223 and the time interval 225 may be included in a cooperated data frame transfer period 231.

Since the source node 110, the relay node 130 or 140, and the destination node 150 may transmit and receive a frame using a directional antenna, the source node 110, the relay node 130 or 140, and the destination node 150 may transmit and receive a frame using an antenna pattern formed in a TPA process.

Before transmitting a frame to the relay node 130 or 140, the source node 110 may use the antenna pattern formed in the TPA process to set an antenna pattern, that is, a beam pattern of the directional antenna in a direction of the relay node 130 or 140. Likewise, before receiving a frame from the source node 110, the relay node 130 or 140 may use the antenna pattern formed in the TPA process to set an antenna pattern in a direction of the source node 110.

Since the destination node 150 simultaneously receives a frame from the relay node 130 or 140 and the source node 110, the destination node 150 may set an antenna pattern of the directional antenna in a direction of the relay node 130 or 140 and the source node 110 using an antenna pattern formed in the TPA process before receiving the frame.

Figure 3:
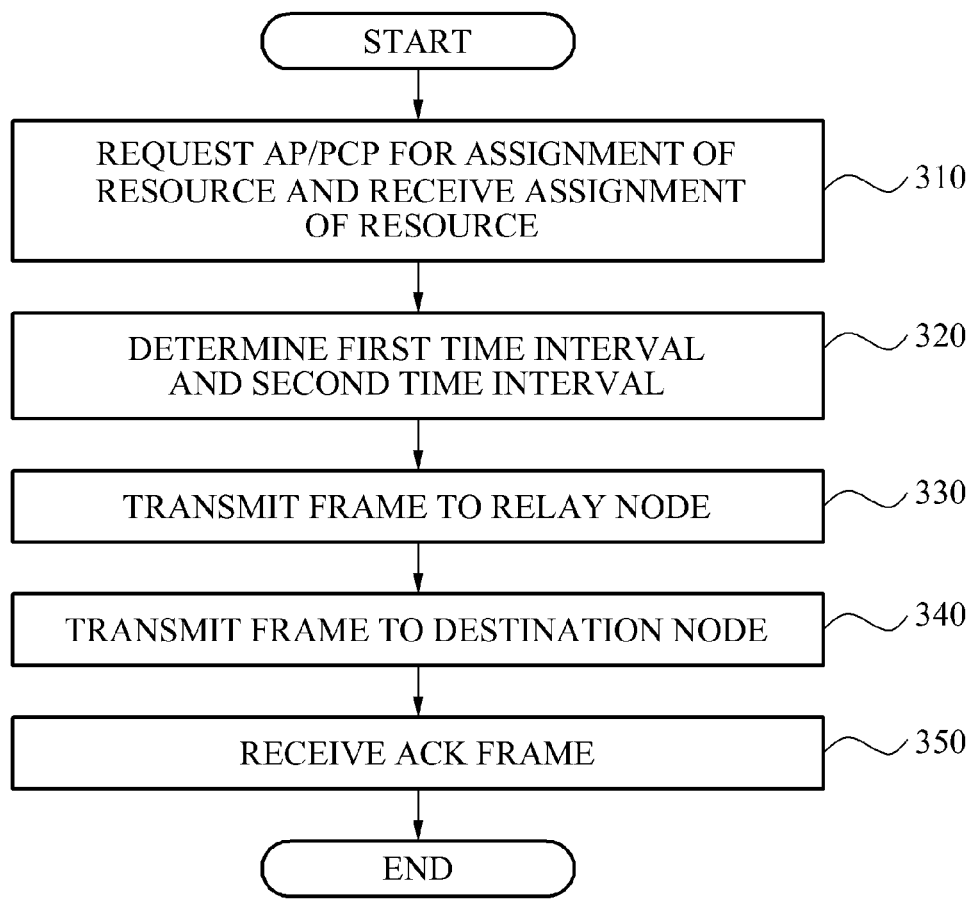
FIG. 3 is a flowchart illustrating a method for wideband short-range wireless communication according to an embodiment of the present invention.

FIG. 3 is a flowchart illustrating a method for wideband short-range wireless communication according to an embodiment of the present invention. An apparatus for wideband short-range wireless communication of FIG. 3 may indicate the source node 110.

In operation 310, in response to a reception of an action frame, indicating that a TPA process is successfully completed, from the destination node 150, the apparatus for wideband short-range wireless communication may request the AP/PCP 120 for an assignment of a resource.

The AP/PCP 120 may transmit information about the assignment of a resource in a Quasi-omni broadcasting scheme, and receive the information about the assignment of a resource from the AP/PCP 120. In this instance, the resource may include a service period.

The apparatus for wideband short-range wireless communication may request the AP/PCP 120 for the assignment of the service period using, as a start signal, a signal indicating a successful transmission time point adjustment when the source node transmits a frame and a successful transmission time point adjustment when the relay node transmits a frame.

In operation 320, the apparatus for wideband short-range wireless communication may determine a first time interval and a second time interval for a cooperated data frame transfer based on a packet transmission time at each transmission from the source node 110 to the destination node 150.

In this instance, the first time interval may be determined based on a period of time during which the source node 110 transmits a frame to the relay node 130 or 140. The first time interval may be determined based on a size of a frame to be transmitted to the relay node 130 or 140 by the source node 110.

The second time interval may be determined based on a predetermined period of time, a period of time during which the relay node 130 or 140 transmits a frame received from the source node 110 to the destination node 150, a period of time during which the source node 110 transmits the same frame to the destination node 150, an SIFS, and a period of time during which the destination node 150 transmits an ACK frame to the source node 110.

The first time interval and the second time interval may be repeated within a service period assigned to transmit a frame. In this instance, the first time interval may be repeated within an assigned service period, and repeated first time intervals may be determined to be the same value or different values. The second time interval may be repeated within an assigned service period, and repeated second time intervals may be determined to be the same value or different values.

In operation 330, the apparatus for wideband short-range wireless communication may transmit a frame to the relay node 130 or 140 through an antenna pattern directed towards the relay node 130 or 140 at a start point of the first time interval. The apparatus for wideband short-range wireless communication may cause an antenna pattern of the source node 110 to be directed towards the relay node 130 or 140 using an antenna pattern formed in the TPA process.

The apparatus for wideband short-range wireless communication may transmit a frame during the first time interval and may transmit a frame during a predetermined period of time within the first time interval.

In operation 340, after a predetermined period of time from a start point of the second time interval, the apparatus for wideband short-range wireless communication may transmit the same frame as the frame transmitted to the relay node 130 or 140 through an antenna pattern directed towards the destination node 150. The apparatus for wideband short-range wireless communication may cause an antenna pattern of the source node 110 to towards the destination node 150 using the antenna pattern formed in the TPA process.

The predetermined period of time may correspond to a sum of a preset period of time and a propagation delay time occurring at a transmission from the source node 110 to the relay node 130 or 140. The apparatus for wideband short-range wireless communication may transmit a frame to the destination node 150 after a preset period of time from a start point of the second time interval and a propagation delay time occurring at a transmission from the source node 110 to the relay node 130 or 140.

In operation 350, the apparatus for wideband short-range wireless communication may receive an ACK frame transmitted by the destination node 150 within the second time interval. The ACK frame may indicate that the destination node 150 receives a frame from the source node 110 and the relay node 130 or 140.

The apparatus for wideband short-range wireless communication may measure a quality of a link between the source node 110 and the relay node 130 or 140 and a quality of a link between the relay node 130 or 140 and the destination node 150. The apparatus for wideband short-range wireless communication may measure a quality of a direct link and a relay link.

In this instance, the apparatus for wideband short-range wireless communication may determine the first time interval and the second time interval based on information about a quality of a link between nodes.

For example, the first time interval corresponds to a period during which the source node 110 transmits a frame to the relay node 130 or 140. Thus, when the quality of the link between the source node 110 and the relay node 130 or 140 excels a quality of an existing link, the apparatus for wideband short-range wireless communication may determine the first time interval to be shorter than an interval of the existing link.

The apparatus for wideband short-range wireless communication may receive, from the relay node 130 or 140, information about the quality of a link between the source node 110 and the relay node 130 or 140 and information about the quality of a link between the relay node 130 or 140 and the destination node 150.

The apparatus for wideband short-range wireless communication may transmit a frame, requesting information about a quality of a link, to the relay node 130 or 140. The relay node 130 or 140 receiving the frame, requesting information about a quality of a link, may transmit a response frame, responding to the request for information about a quality of a link, and information, about a quality of a link between nodes, to the apparatus for wideband short-range wireless communication.

The apparatus for wideband short-range wireless communication may transmit information about the measured qualities of links to the AP/PCP 120, and may receive, from the AP/PCP 120, a new resource based on the information about the measured qualities of links. For example, when a measured quality of a link is inferior to a preset criterion, the AP/PCP 120 may reassign a new service period extended compared to the assigned service period.

When a link cooperation process is completed, the apparatus for wideband short-range wireless communication may release a frame transmission operation among the source node 110, the relay node 130 or 140, and the destination node 150. The releasing of the frame transmission operation may be referred to as a relay link setup teardown.

In this instance, the source node 110 may transmit a relay link setup teardown frame to the relay node 130 or 140, the destination node 150, and the AP/PCP 120 of a corresponding network. The source node 110 may set a source association ID (AID) field of the relay link setup teardown frame to an AID of the source node 110, set a destination AID field of the relay link setup teardown frame to an AID of the destination node 150, and set a relay AID field of the relay link setup teardown frame to an AID of the relay node 130 or 140.

The relay node 130 or 140 may release the frame transmission operation among the source node 110, the relay node 130 or 140, and the destination node 150. In this instance, the relay node 130 or 140 may transmit the relay link setup teardown frame to the source node 110, the destination node 150, and the AP/PCP 120 of a corresponding network. The relay node 130 or 140 may set the source AID field of the relay link setup teardown frame to an AID of the source node 110, set the destination AID field of the relay link setup teardown frame to an AID of the destination node 150, and set the relay AID field of the relay link setup teardown frame to an AID of the relay node 130 or 140.

Figure 4:
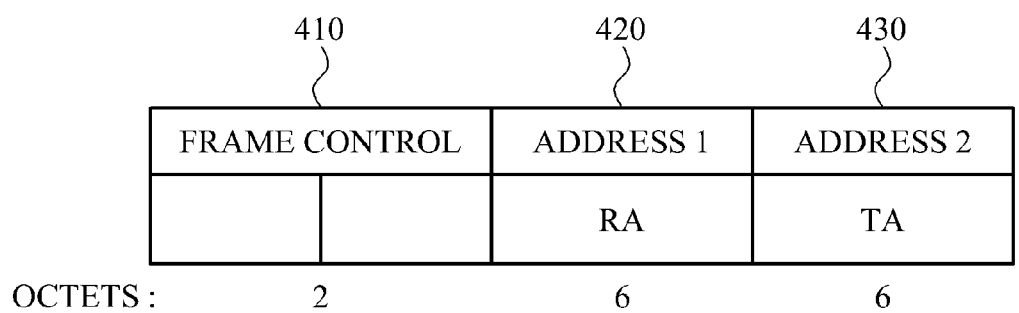
FIG. 4 is a diagram illustrating a portion of a frame used for a process of wideband short-range wireless communication according to an embodiment of the present invention.

FIG. 4 is a diagram illustrating a portion of a frame used for a process of wideband short-range wireless communication according to an embodiment of the present invention.

The source node 110 may transmit a frame to the relay node 130 or 140 and the destination node 150. In this instance, the frame may include a manager frame, a control frame, and a data frame. A medium access control (MAC) header of the frame transmitted from the source node 110 may include a frame control field 410, a receiver address field 420, and a transmitter address field 430.

The source node 110 may set an MAC address of the source node 110 to a transmitter address of an MAC header of a transmission frame. The source node 110 may set an MAC address of the destination node 150 to a receiver address of an MAC header.

The relay node 130 or 140 may receive a frame from the source node 110 and transfer the received frame to the destination node 150. In this instance, the relay node 130 or 140 may set the MAC address of the source node 110 to the transmitter address of the MAC header of a transmission frame. The relay node 130 or 140 may set the MAC address of the destination node 150 to the receiver address of the MAC header.

Figure 5:
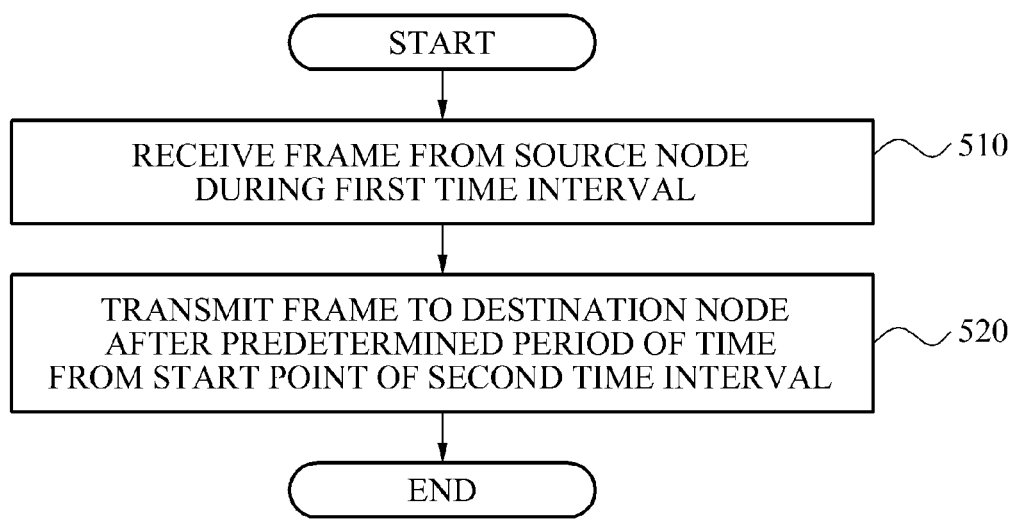
FIG. 5 is a flowchart illustrating a method for wideband short-range wireless communication according to an embodiment of the present invention.

FIG. 5 is a flowchart illustrating a method for wideband short-range wireless communication according to an embodiment of the present invention. An apparatus for wideband short-range wireless communication of FIG. 5 may indicate the relay node 130 or 140.

In operation 510, the apparatus for wideband short-range wireless communication may receive a frame from the source node 110 through an antenna pattern directed towards the source node 110 during a first time interval in a service period assigned from the AP/PCP 120. The first time interval may be determined based on a packet transmission time at each transmission from the source node 110 to the destination node 150.

In operation 520, the apparatus for wideband short-range wireless communication may transmit the frame received from the source node 110 to the destination node 150 through an antenna pattern directed towards the destination node 150 after a predetermined period of time from a start point of a second time interval. The second time interval may be determined based on the packet transmission time at each transmission from the source node 110 to the destination node 150.

The predetermined period of time may correspond to a sum of a preset period of time and a period of time obtained by subtracting a propagation delay time, occurring at a transmission from the destination node 150 to the relay node 130 or 140, from a propagation delay time, occurring at a transmission from the destination node 150 to the source node 110.

The relay node 130 or 140 may operate by a half-duplex scheme to receive the frame from the source node 110, and may transmit the received frame to the destination node 150.

The apparatus for wideband short-range wireless communication may set an MAC address of the source node 110 to a transmitter address of an MAC header of a transmission frame. The apparatus for wideband short-range wireless communication may set an MAC of the destination node 150 to a transmitter address of an MAC header of a transmission frame.

The apparatus for wideband short-range wireless communication may measure a quality of a link between the source node 110 and the relay node 130 or 140 and a quality of a link between relay node 130 or 140 and the destination node 150. The apparatus for wideband short-range wireless communication may measure a quality of a direct link and a relay link.

The apparatus for wideband short-range wireless communication may transmit, to the source node 110, information about the quality of a link between the source node 110 and the relay node 130 or 140 and information about the quality of a link between the relay node 130 or 140 and the destination node 150. In this instance, the apparatus for wideband short-range wireless communication may transmit the information about the quality of a link through a link margin response frame. The link margin response frame may include the information about the quality of a link between the source node 110 and the relay node 130 or 140 and the information about the quality of a link between relay node 130 or 140 and the destination node 150.

The source node 110 may determine or update the first time interval and the second time interval based on information about the quality of each link. The source node 110 may change a modulation and coding scheme used for transmitting a frame to the relay node 130 or 140 and the destination node 150 based on the information about the quality of each link.

Figure 6:
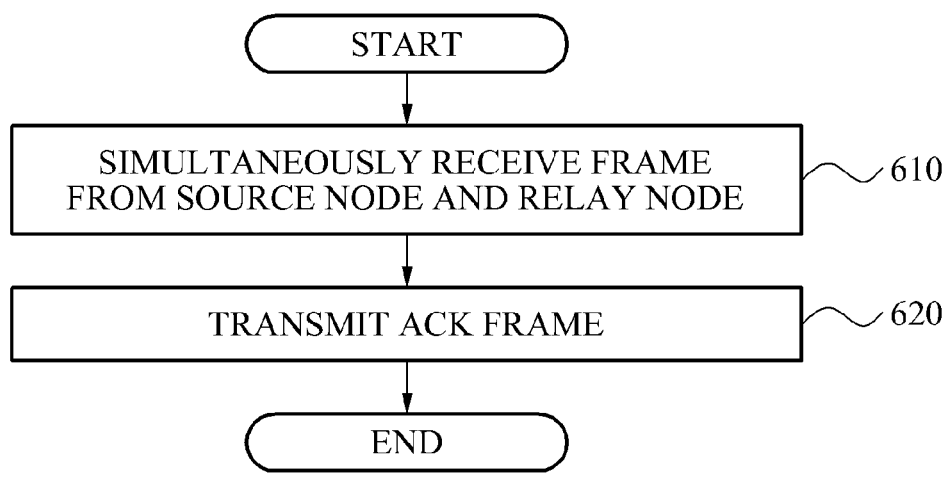
FIG. 6 is a flowchart illustrating a method for wideband short-range wireless communication according to an embodiment of the present invention.

FIG. 6 is a flowchart illustrating a method for wideband short-range wireless communication according to an embodiment of the present invention. The apparatus for wideband short-range wireless communication may indicate the destination node 150.

In a service period assigned from the AP/PCP 120, the source node 110 may determine a first time interval and a second time interval based on a packet transmission time at each transmission from the source node 110 to the destination node 150.

In operation 610, the apparatus for wideband short-range wireless communication may simultaneously receive a frame transmitted from the source node 110 and a frame transmitted from the relay node 130 or 140 after a predetermined period of time from a start point of the second time interval. In this instance, the frame transmitted from the relay node 130 or 140 may be the same as the frame transmitted from the source node 110.

Since the apparatus for wideband short-range wireless communication may receive the same frame from the relay node 130 or 140 and the source node 110, the apparatus for wideband short-range wireless communication may also acquire an enhanced received signal level.

The apparatus for wideband short-range wireless communication may simultaneously receive the frame transmitted from the source node 110 and the frame transmitted from the relay node 130 or 140 through an antenna pattern directed towards the relay node 130 or 140 and the source node 110.

In operation 620, the apparatus for wideband short-range wireless communication may transmit an ACK frame to the source node 110 through an antenna pattern directed towards the source node 110 within the second time interval. Here, the ACK frame may indicate that the apparatus for wideband short-range wireless communication receives a frame from the source node 110 and the relay node 130 or 140.

Figure 7:
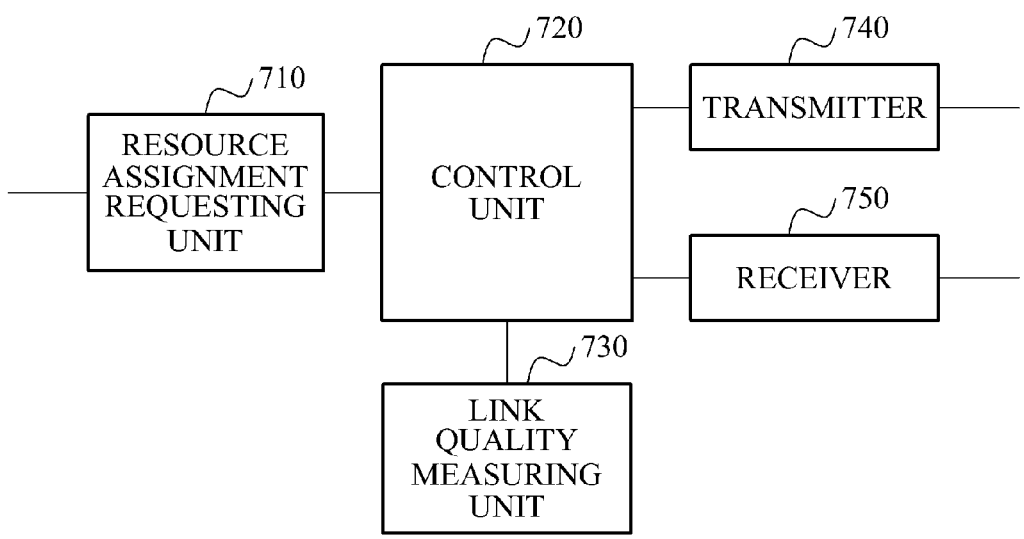
FIG. 7 is a block diagram illustrating an apparatus for wideband short-range wireless communication according to an embodiment of the present invention.

FIG. 7 is a block diagram illustrating an apparatus for wideband short-range wireless communication according to an embodiment of the present invention. The apparatus for wideband short-range wireless communication of FIG. 7 may correspond to a source node of a system for wideband short-range wireless communication.

Referring to FIG. 7, the apparatus for wideband short-range wireless communication may include a resource assignment requesting unit 710, a control unit 720, a link quality measuring unit 730, a transmitter 740, and a receiver 750.

The resource assignment requesting unit 710 may request an AP/PCP for an assignment of a resource, and may receive the assignment of the service period from the AP/PCP. Here, the resource may include a service period.

Information about an assigned resource may correspond to the service period, and may include information about a period during which data may be transmitted and received among a source node, a relay node, and a destination node in a predetermined time region of a non-contentious period.

The control unit 720 may determine a first time interval and a second time interval for a cooperated data frame transfer based on a packet transmission time at each transmission from the source node to the destination node.

In this instance, the first time interval may be determined based on a period of time during which the source node transmits a frame to the relay node. The first time interval may be determined based on a size of a frame to be transmitted to the relay node by the source node.

The second time interval may be determined based on a predetermined period of time, a period of time during which the relay node transmits a frame, received from the source node, to the destination node, a period of time during which the source node transmits the same frame to the destination node, an SIFS, and a period of time during which the destination node transmits an ACK frame to the source node.

The first time interval and the second time interval may be repeated within a service period assigned to transmit a frame. In this instance, the first time interval may be repeated within an assigned service period, and repeated first time intervals may be determined to be the same value or different values. The second time interval may be repeated within an assigned service period, and repeated second time intervals may be determined to be the same value or different values.

The control unit 720 may determine the first time interval and the second time interval based on information about a quality of a link between the source node and the relay node, information about a quality of a link between the relay node and the destination node, and information about a quality of a link between the source node and the destination node.

The link quality measuring unit 730 may measure the quality of a link between the source node and the relay node, the quality of a link between the relay node and the destination node, and the quality of a link between the source node and the destination node. The link quality measuring unit 730 may measure a quality of a direct link and relay link.

The transmitter 740 may transmit a frame to the relay node through an antenna pattern directed towards the relay node at a start point of the first time interval. The transmitter 740 may transmit the same frame as the frame transmitted to the relay node through an antenna pattern directed towards the destination node after a predetermined period of time from a start point of the second time interval.

The predetermined period of time may correspond to a sum of a preset period of time and a propagation delay time occurring at a transmission from the source node to the relay node.

The transmitter 740 may set an MAC address of the source node to a transmitter address of an MAC header of a transmission frame. The transmitter 740 may set an MAC address of the destination node to a receiver address of an MAC header of a transmission frame. The transmitter 740 may transmit a frame to the relay node using the transmitter address and the receiver address.

In response to a completion of a cooperated data frame transfer among the source node, the relay node, and the destination node, the transmitter 740 may transmit a relay link setup teardown frame to the relay node, the destination node, and an AP or PCP of a network performing a relay link setup. The relay link setup may indicate a procedure of setting up a relay link using the relay node to transmit a cooperated data frame to the destination node by the source node.

The receiver 750 may receive an ACK frame transmitted from the destination node within the second time interval. Here, the ACK frame may indicate that the destination node receives a frame from the source node and the relay node.

The receiver 750 may receive, from the relay node, information about the quality of a link between the source node and the relay node and information about the quality of a link between the relay node and the destination node. The receiver 750 may receive information about the quality of a link through a link margin response frame. The link margin response frame may include the information about the quality of a link between the source node and the relay node and the information about the quality of a link between the relay node and the destination node.

In this instance, the control unit 720 may change a modulation and coding scheme used for transmitting a frame to the relay node and the destination node based on the information about the quality of a link between the source node and the relay node and the information about the quality of a link between the relay node and the destination node.

The destination node may be set to enable an antenna pattern to be simultaneously directed to the relay node and the source node during the second time interval. The destination node may be set to enable the antenna pattern to be simultaneously directed to the relay node and the source node to acquire an enhanced received signal level by receiving the same frame through the relay link and the direct link during the second time interval.

FIG. 8 through FIG. 15 are diagrams illustrating a mechanism of a method for wideband short-range wireless communication according to various embodiments of the present invention.

Figure 8:
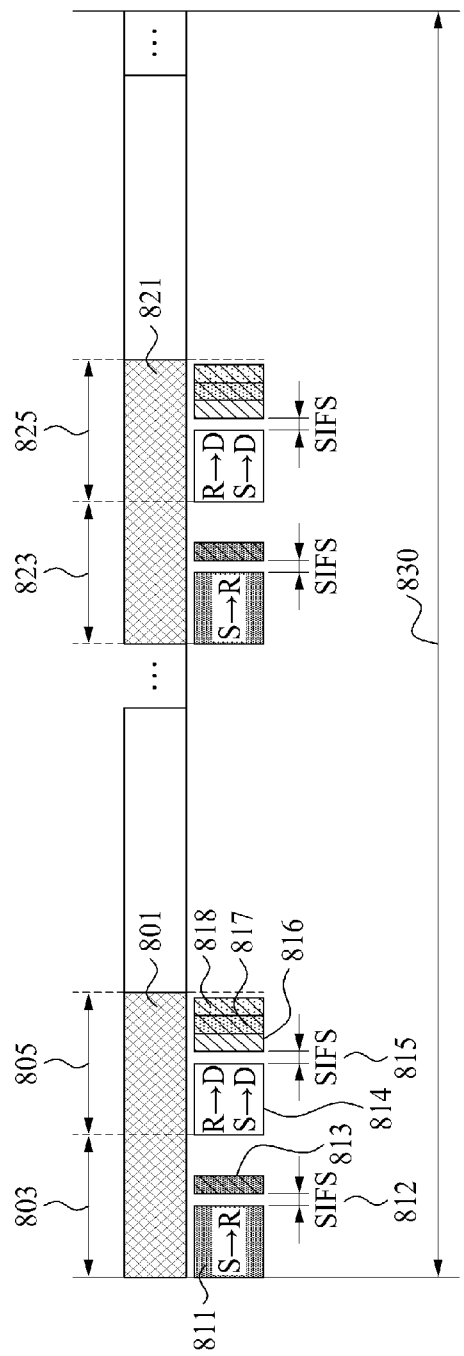
FIG. 8 through FIG. 15 are diagrams illustrating a mechanism of a method for wideband short-range wireless communication according to various embodiments of the present invention.

FIG. 8 illustrates that an ACK frame is transmitted at a relay node during a time interval 803.

The source node 110 may determine a time interval 803 and a time interval 805 for a cooperated data frame transfer in a service period 830 assigned from the AP/PCP 120. The time interval 803 and the time interval 805 may be included in a cooperated data frame transfer period 801.

Within the time interval 803, the source node 110 may transmit a data frame 811 to the relay node 130 or 140 using an antenna pattern. The source node 110 may receive an ACK frame 813 from the relay node 130 or 140 after an SIFS 812. By receiving the ACK frame 813 from the relay node 130 or 140, the source node may perform a relatively more stable communication. In this instance, in the relay node 130 or 140, a frame, transmitted when indicating whether a data packet received from the source node 110 is succeeded, has been defined to be an ACK frame, and may be defined to be a control frame.

Within the time interval 805, the source node 110 and the relay node 130 or 140 may transmit a data frame 814 to the destination node 150. The relay node 130 or 140 may transmit a data frame 811, received from the source node 110, to the destination node 150. That is, the data frame 814 and the data frame 811 may be basically identical. A transmission time point of the source node 110 and a transmission time point of the relay node 130 or 140 may be different from each other so that the data frame 814 may be received in the destination node 150 simultaneously or within a cyclic prefix.

Within the time interval 805, the destination node 150 may decode the data frame 814 received from the source node 110 and the relay node 130 or 140 to detect whether an error exists. When no error is detected, the destination node 150 may successively transmit an ACK frame 816 where a beamforming is performed to the relay node 130 or 140 and an ACK frame 817 where a beamforming is performed to the source node 110 after an SIFS 815. The relay node 130 or 140 may perform a beamforming with respect to the received ACK frame 816 towards the source node 110, and transmit an ACK frame 818 where a beamforming is performed towards the source node 110.

Within the time interval 805, when the source node 110 completely receives the ACK frame 817 from the destination node 150, the source node 110 may not decode the ACK frame 818 received from the relay node 130 or 140 thereafter. However, when the ACK frame 817 is not completely received from the destination node 150, the source node 110 may decode the ACK frame 818 received from the relay node 130 or 140 to determine whether a packet is successfully transmitted in the time interval 803 and the time interval 805.

The source node 110 may determine a time interval 823 and a time interval 825 to transmit further data frames to the destination node 150 repeatedly until an assigned service period 830 is completed, and may exchange a data frame with the relay node 130 or 140 and the destination node 150. The time interval 823 and the time interval 825 may be included in a cooperated data frame transfer period 821.

Since the source node 110, the relay node 130 or 140, and the destination node 150 may transmit and receive a frame using a directional antenna, the source node 110, the relay node 130 or 140, and the destination node 150 may also transmit and receive a frame using an antenna pattern formed in a TPA process.

Figure 9:
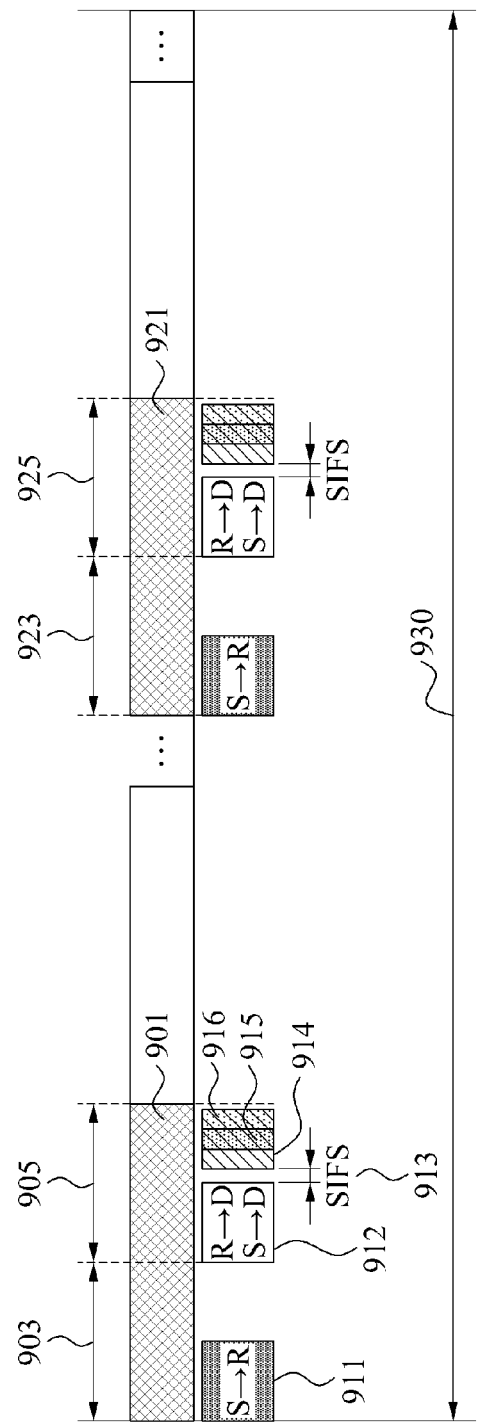

FIG. 9 illustrates that an ACK frame is not transmitted at a relay node during a time interval 903 in contrast to FIG. 8.

The source node 110 may determine a time interval 903 and a time interval 905 for a cooperated data frame transfer in a service period 930 assigned from the AP/PCP 120. The time interval 903 and the time interval 905 may be included in a cooperated data frame transfer period 901.

Within the time interval 903, the source node 110 may transmit a data frame 911 to the relay node 130 or 140 using an antenna pattern. However, in contrast to FIG. 8, the relay node 130 or 140 may decode and restore a received data frame 911, and may neglect whether the packet is successfully restored. Thus, an ACK frame may not be transmitted to the source node 110.

Within the time interval 905, the source node 110 and the relay node 130 or 140 may transmit a data frame 912 to the destination node 150. The relay node 130 or 140 may transmit a data frame 911, received from the source node 110, to the destination node 150. That is, the data frame 912 and the data frame 911 may be basically identical. A transmission time point of the source node 110 and a transmission time point of the relay node 130 or 140 may be different from each other so that the data frame 912 may be received in the destination node 150 simultaneously or within a cyclic prefix.

Within the time interval 905, the destination node 150 may decode the data frame received from the source node 110 and the relay node 130 or 140 to detect whether an error exists. When no error is detected, the destination node 150 may successively transmit an ACK frame 914 where a beamforming is performed to the relay node 130 or 140 and an ACK frame 915 where a beamforming is performed to the source node 110 after an SIFS 913. The relay node 130 or 140 may perform a beamforming with respect to the received ACK frame 914 towards the source node 110, and transmit an ACK frame 916 where a beamforming is performed towards the source node 110.

The source node 110 may determine a time interval 923 and a time interval 925 to transmit further data frames to the destination node 150 repeatedly until an assigned service period 930 is completed, and may exchange a data frame with the relay node 130 or 140 and the destination node 150. The time interval 923 and the time interval 925 may be included in a cooperated data frame transfer period 921.

Figure 10:
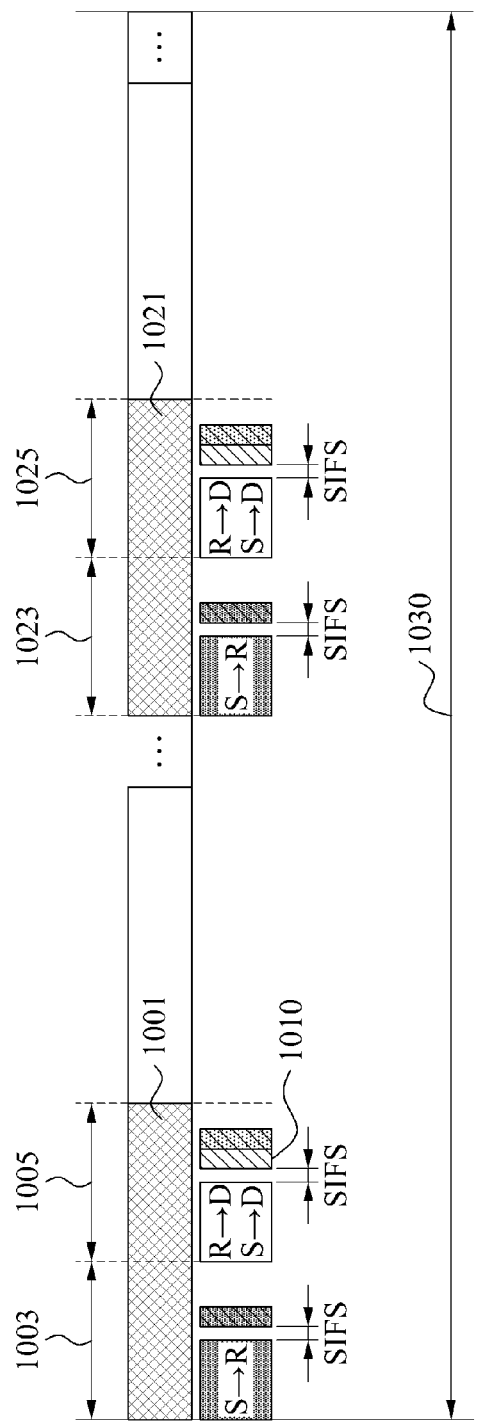

FIG. 10 illustrates that an ACK frame is simultaneously transmitted to a source node and a relay node at a destination node during a time interval 1005, in comparison to FIG. 8.

The source node 110 may determine a time interval 1003 and a time interval 1005 for a cooperated data frame transfer in a service period 1030 assigned from the AP/PCP 120. The time interval 1003 and the time interval 1005 may be included in a cooperated data frame transfer period 1001.

In comparison with FIG. 8, within the time interval 1005, the destination node 150 may decode a data frame received from the source node 110 and the relay node 130 or 140 to detect whether an error exists. When no error is detected, the destination node 150 may simultaneously transmit an ACK frame where a beamforming is performed to the relay node 130 or 140 and an ACK frame where a beamforming is performed to the source node 110 after an SIFS 1005. The relay node 130 or 140 may perform a beamforming with respect to the received ACK frame towards the source node 110, and transmit an ACK frame where a beamforming is performed towards the source node 110.

The source node 110 may determine a time interval 1023 and a time interval 1025 to transmit further data frames to the destination node 150 repeatedly until an assigned service period 1030 is completed, and may exchange a data frame with the relay node 130 or 140 and the destination node 150. The time interval 1023 and the time interval 1025 may be included in a cooperated data frame transfer period 1021.

Figure 11:
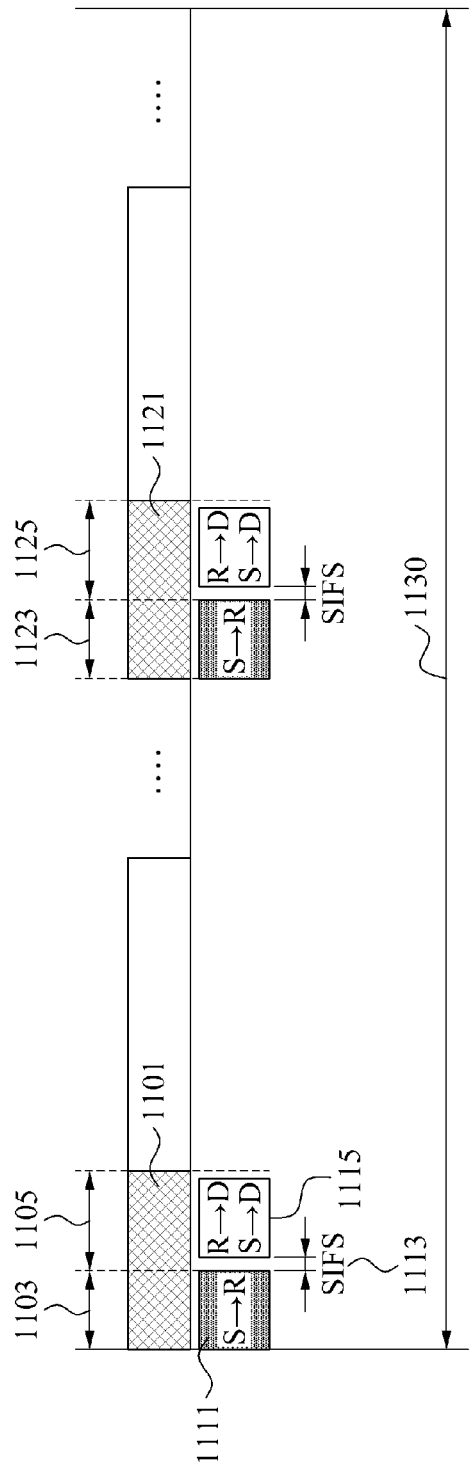

FIG. 11 illustrates that an ACK frame is not transmitted during a time interval 1103 and a time interval 1105, that is, a case of No-ACK, in comparison to FIG. 8.

The source node 110 may determine a time interval 1103 and a time interval 1105 for a cooperated data frame transfer in a service period 1130 assigned from the AP/PCP 120. The time interval 1103 and the time interval 1105 may be included in a cooperated data frame transfer period 1101.

Within the time interval 1103, the source node 110 may transmit a data frame 1111 to the relay node 130 or 140 using an antenna pattern.

Within the time interval 1105, the source node 110 and the relay node 130 or 140 may transmit a data frame 1115 to the destination node 150 after an SIFS 1113. The relay node 130 or 140 may transmit a data frame 1111, received from the source node 110, to the destination node 150. That is, the data frame 1115 and the data frame 1111 may be basically identical. A transmission time point of the source node 110 and a transmission time point of the relay node 130 or 140 may be different from each other so that the data frame 1115 may be received in the destination node 150 simultaneously or within a cyclic prefix.

Within the time interval 1105, the source node 110 and the relay node 130 or 140 may set an MAC address of the relay node 130 or 140 to a transmitter address of an MAC header of the data frame 1115.

Within the time interval 1105, the source node 110 and the relay node 130 or 140 may set an MAC address of the source node 110 to a transmitter address of an MAC header of the data frame 1115.

The source node 110 may determine a time interval 1123 and a time interval 1125 to repeatedly transmit further data frames to the destination node 150 until an assigned service period 1130 is completed, and may exchange a data frame with the relay node 130 or 140 and the destination node 150. The time interval 1123 and the time interval 1125 may be included in a cooperated data frame transfer period 1121.

Figure 12:
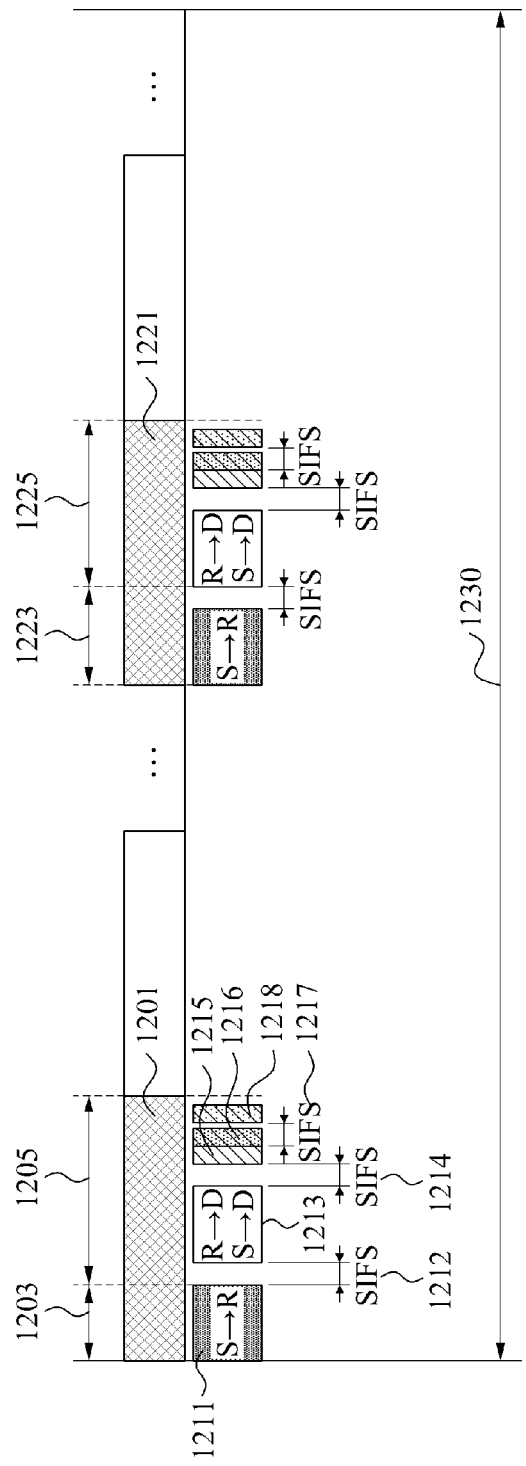

FIG. 12 illustrates that an immediate-ACK frame is transmitted at a destination node and a relay node during a time interval 1205, in comparison to FIG. 11.

The source node 110 may determine a time interval 1203 and a time interval 1205 for a cooperated data frame transfer in a service period 1230 assigned from the AP/PCP 120. The time interval 1203 and the time interval 1205 may be included in a cooperated data frame transfer period 1201.

Within the time interval 1203, the source node 110 may transmit a data frame 1211 to the relay node 130 or 140 using an antenna pattern.

Within the time interval 1205, the source node 110 and the relay node 130 or 140 may transmit a data frame 1213 to the destination node 150 after an SIFS 1212.

Within the time interval 1205, the destination node 150 may decode the data frame 1213 received from the source node 110 and the relay node 130 or 140 to detect whether an error exists. When no error is detected, the destination node 150 may successively transmit an immediate-ACK frame 1215 where a beamforming is performed to the relay node 130 or 140 and an ACK frame 1216 where a beamforming is performed to the source node 110 after an SIFS 1214.

In this instance, a duration time of the ACK frame 1216 where a beamforming is performed to the source node 110 may be shorter or longer than a predetermined SIFS 1217. The relay node 130 or 140 may perform a beamforming with respect to the received immediate-ACK frame 1215 towards the source node 110 and may transmit a relay ACK frame 1218 where a beamforming is performed towards the source node 110.

The source node 110 may determine a time interval 1223 and a time interval 1225 to transmit further data frames to the destination node 150 repeatedly until an assigned service period 1230 is completed, and may exchange a data frame with the relay node 130 or 140 and the destination node 150. The time interval 1223 and the time interval 1225 may be included in a cooperated data frame transfer period 1221.

Figure 13:
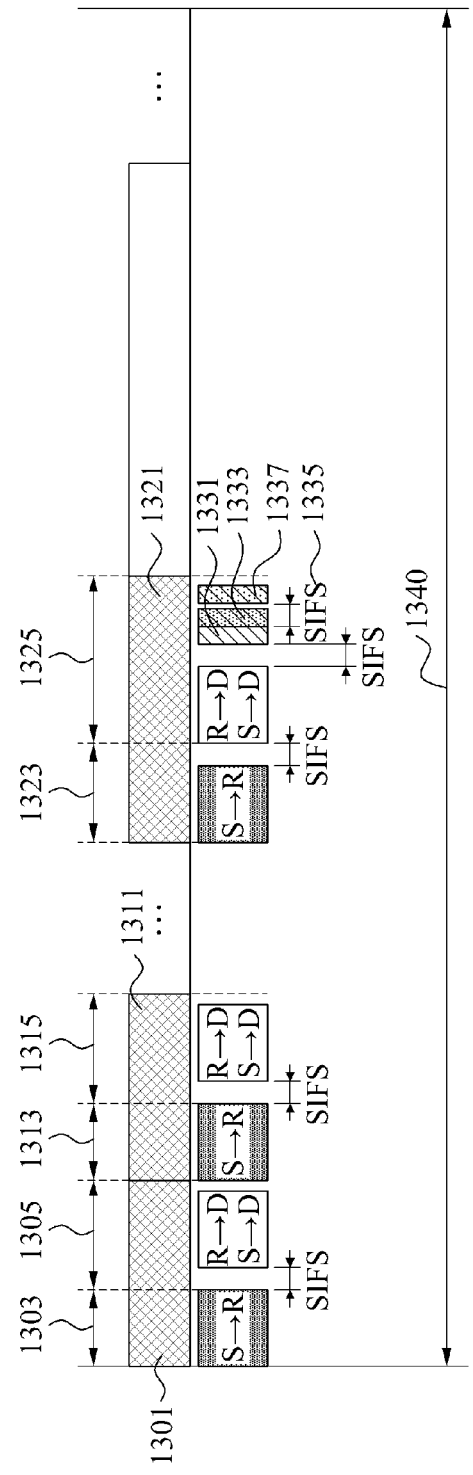

FIG. 13 illustrates that a block-ACK frame is transmitted at a destination node and a relay node, in comparison to FIG. 11.

The source node 110 may determine a time interval 1303 and a time interval 1305 for a cooperated data frame transfer in a service period 1340 assigned from the AP/PCP 120. The time interval 1303 and the time interval 1305 may be included in a cooperated data frame transfer period 1301.

Within the time interval 1303, the source node 110 may transmit a data frame 1211 to the relay node 130 or 140 using an antenna pattern.

Within the time interval 1305, the source node 110 and the relay node 130 or 140 may transmit a data frame to the destination node 150 after an SIFS.

The source node 110 may determine a time interval 1313 and a time interval 1315 to transmit further data frames to the destination node 150 within an assigned service period 1340, and may exchange a data frame with the relay node 130 or 140 and the destination node 150. The time interval 1313 and the time interval 1315 may be included in a cooperated data frame transfer period 1311.

The source node 110 may determine a time interval 1323 and a time interval 1325 to transmit further data frames to the destination node 150 within the assigned service period 1340, and may exchange a data frame with the relay node 130 or 140 and the destination node 150. The time interval 1323 and the time interval 1325 may be included in a cooperated data frame transfer period 1321.

In this instance, within the time interval 1325, the destination node 150 may decode the data frame received from the source node 110 and the relay node 130 or 140 to detect whether an error exists. When no error is detected, the destination node 150 may successively transmit a block-ACK frame 1331 where a beamforming is performed to the relay node 130 or 140 and an ACK frame 1333 where a beamforming is performed to the source node 110 after an SIFS.

In this instance, a duration time of the block-ACK frame 1333 where a beamforming is performed to the source node 110 may be shorter or longer than a predetermined SIFS 1335. The relay node 130 or 140 may perform a beamforming with respect to the received block-ACK frame 1331 towards the source node 110 and may transmit a block-ACK frame 1337 where a beamforming is performed towards the source node 110.

Figure 14:
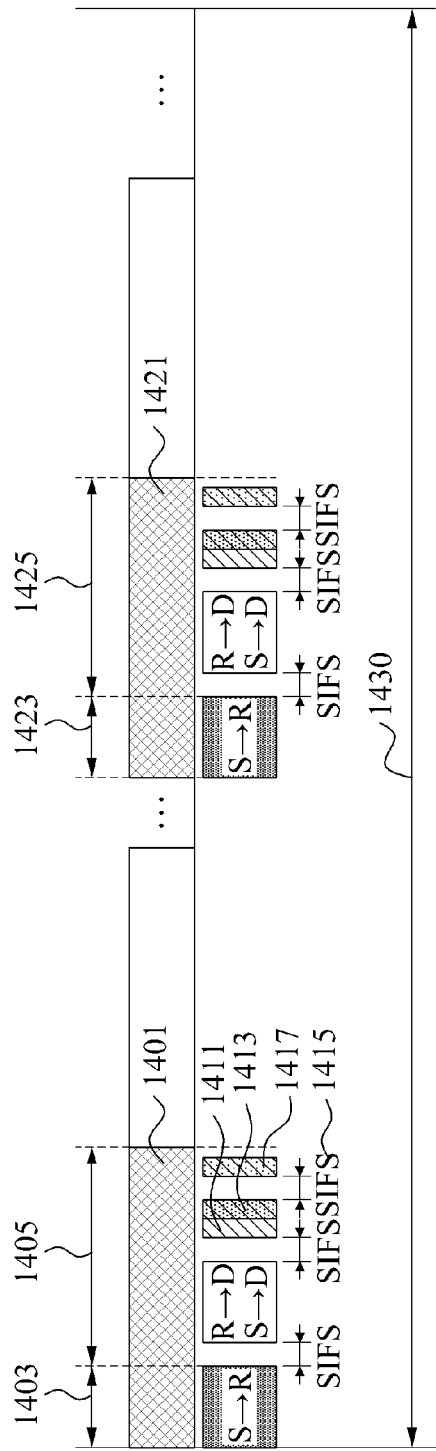

FIG. 14 illustrates that an immediate-ACK frame and a relay ACK frame is transmitted at a destination node and a relay ACK frame is transmitted at a relay node during a time interval 1405, in comparison to FIG. 11.

The source node 110 may determine a time interval 1403 and a time interval 1405 for a cooperated data frame transfer in a service period 1430 assigned from the AP/PCP 120. The time interval 1403 and the time interval 1405 may be included in a cooperated data frame transfer period 1401.

Within the time interval 1403, the source node 110 may transmit a data frame to the relay node 130 or 140 using an antenna pattern.

Within the time interval 1405, the source node 110 and the relay node 130 or 140 may transmit a data frame to the destination node 150 after an SIFS.

Within the time interval 1405, the destination node 150 may decode the data frame received from the source node 110 and the relay node 130 or 140 to detect whether an error exists. When no error is detected, the destination node 150 may transmit an immediate-ACK frame 1411 where a beamforming is performed to the source node 110 and successively transmit a relay ACK frame 1413 where a beamforming is performed to the relay node 130 or 140 after an SIFS.

After an SIFS 1415, the relay node 130 or 140 may perform a beamforming with respect to the received relay ACK frame 1413 towards the source node 110, and may transmit a relay ACK frame 1417 where a beamforming is performed towards the source node 110.

The source node 110 may determine a time interval 1423 and a time interval 1425 to transmit further data frames to the destination node 150 repeatedly until an assigned service period 1430 is completed, and may exchange a data frame with the relay node 130 or 140 and the destination node 150. The time interval 1423 and the time interval 1425 may be included in a cooperated data frame transfer period 1421.

Figure 15:
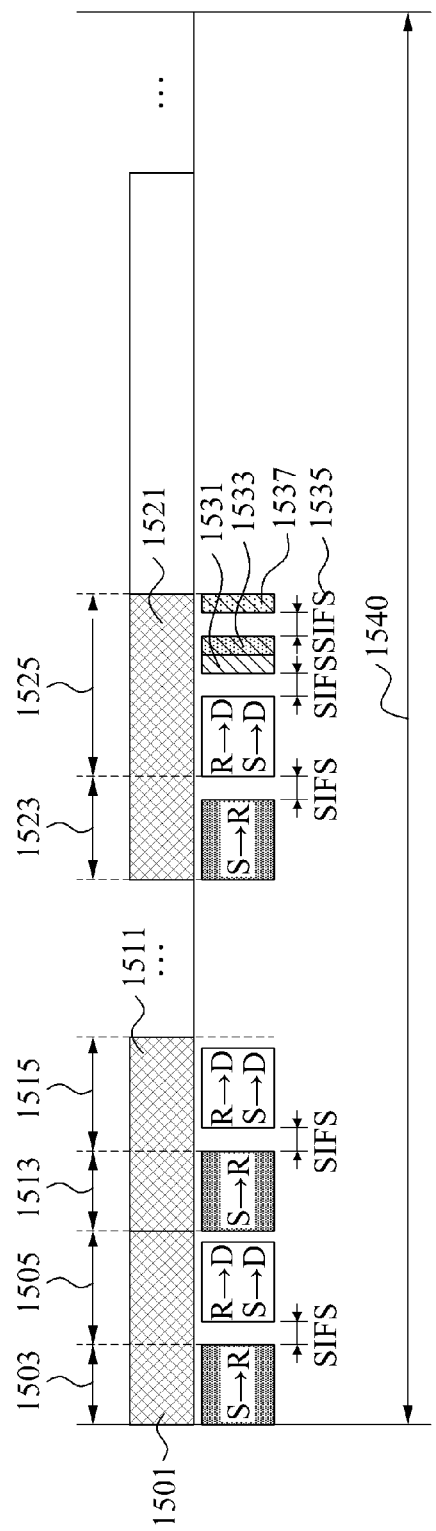

FIG. 15 illustrates that a block-ACK frame and a relay block-ACK frame is transmitted at a destination node and a relay block-ACK frame is transmitted at a relay node, in comparison to FIG. 11.

The source node 110 may determine a time interval 1503 and a time interval 1505 for a cooperated data frame transfer in a service period 1540 assigned from the AP/PCP 120. The time interval 1503 and the time interval 1505 may be included in a cooperated data frame transfer period 1501.

Within the time interval 1503, the source node 110 may transmit a data frame to the relay node 130 or 140 using an antenna pattern.

Within the time interval 1505, the source node 110 and the relay node 130 or 140 may transmit a data frame to the destination node 150 after an SIFS.

The source node 110 may determine a time interval 1513 and a time interval 1515 to transmit further data frames to the destination node 150 within an assigned service period 1540, and may exchange a data frame with the relay node 130 or 140 and the destination node 150. The time interval 1513 and the time interval 1515 may be included in a cooperated data frame transfer period 1511.

The source node 110 may determine a time interval 1523 and a time interval 1525 to transmit further data frames to the destination node 150 within an assigned service period 1340, and may exchange a data frame with the relay node 130 or 140 and the destination node 150. The time interval 1523 and the time interval 1525 may be included in a cooperated data frame transfer period 1521.

In this instance, within the time interval 1525, the destination node 150 may decode the data frame received from the source node 110 and the relay node 130 or 140 to detect whether an error exists. When no error is detected, the destination node 150 may transmit a block-ACK frame 1531 where a beamforming is performed to the source node 110 and successively transmit a relay block-ACK frame 1533 where a beamforming is performed to the relay node 130 or 140 after an SIFS.

After an SIFS 1535, the relay node 130 or 140 may perform a beamforming with respect to the received relay block-ACK frame 1533 towards the source node 110, and may transmit a relay block-ACK frame 1537 where a beamforming is performed towards the source node 110.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for wireless communication performed by a source node, the method comprising:
   requesting an access point (AP) or a Personal basic service set Control Point (PCP) for an assignment of a resource corresponding to a service period;
   receiving the assignment of the service period from the AP or the PCP;
   identifying a first time interval for transmission from the source node to a relay node and a second time interval for transmission from the source node to a destination node;
   transmitting a data frame to a relay node through an antenna pattern directed towards the relay node at a start point of the first time interval; and
   transmitting the data frame to the destination node through an antenna pattern directed towards the destination node after a predetermined period from a start point of the second time interval,
   wherein the second time interval is allocated after the first time interval,
   wherein among the source node, the relay node and the destination node perform a Transmission Time-Point Adjustment (TPA) procedure, and
   wherein the requesting comprises requesting the assignment of the service period using, as a start signal, a signal indicating a successful transmission time point adjustment when the source node transmits the data frame and a successful transmission time point adjustment when the relay node transmits the data frame.

2. The method of claim 1, wherein:
   the first time interval is determined based on a period of time during which the source node transmits the data frame to the relay node, and
   the second time interval is determined based on a predetermined period, a period of time during which the relay node transmits the data frame received from the source node to the destination node, a period of time during which the source node transmits the data frame to the destination node, a period of time during which the destination node transmits an acknowledgment frame to the source node.

3. The method of claim 2, wherein:
   the first time interval is repeated within an assigned service period, and repeated first time intervals are determined to be the same value or different values, and
   the second time interval is repeated within an assigned service period, and repeated second time intervals are determined to be the same value or different values.

4. The method of claim 1, further comprising:
   receiving an acknowledgment frame indicating the data frame is received from the destination node within the second time interval.

5. The method of claim 1, further comprising:
   measuring a quality of a link between the source node and the relay node, a quality of a link between the relay node and the destination node, and a quality of a link between the source node and the destination node,
   wherein the determining comprises determining the first time interval and the second time interval based on information about the quality of the link between the source node and the relay node, information about the quality of the link between the relay node and the destination node, and information about the quality of the link between the source node and the destination node.

6. The method of claim 5, further comprising:
   transmitting information about the measured qualities of links to the AP or the PCP; and
   receiving, from the AP or the PCP, a further assignment of a resource based on the information about the measured qualities of links.

7. The method of claim 5, wherein the measuring comprises receiving, from the relay node, the information about the quality of the link between the source node and the relay node and the information about the quality of the link between the relay node and the destination node.

8. The method of claim 1, wherein the AP or the PCP transmits information about the assignment of a resource, for each direction and based on a period of time, through a beam pattern formed in all directions of the AP or the PCP.

9. The method of claim 1, wherein the transmitting of the data frame to the relay node comprises setting a medium access control (MAC) address of the source node to a transmitter address of an MAC header, setting an MAC address of the destination node to a receiver address of the MAC header, and transmitting the data frame.

10. The method of claim 1, wherein the predetermined period of time corresponds to a sum of a preset period of time from a start point of the second time interval and a propagation delay time occurring at a transmission from the source node to the relay node.

11. The method of claim 1, further comprising:
    receiving an acknowledgment frame from the relay node after a predetermined period of time and a predetermined period from the start point of the first time interval,
    wherein the transmitting of the data frame to the relay node comprises transmitting the data frame for the predetermined period of time.

12. The method of claim 11, further comprising:
    receiving an acknowledgment frame from the destination node and receiving an acknowledgment frame from the relay node after a predetermined period is passed after a transmission of the data frame to the destination node is completed within the second time interval.

13. A method for wireless communication performed by a relay node, the method comprising:
    receiving a data frame from a source node through an antenna pattern directed towards the source node, during a first time interval; and
    transmitting the data frame to a destination node through an antenna pattern directed towards the destination node after a predetermined period from a start point of a second time interval,
    wherein the second time interval is allocated after the first time interval, wherein the data frame is transmitted from the source node to the destination node after the predetermined period from the start point of the second time interval, wherein among the source node, the relay node and the destination node perform a Transmission Time-Point Adjustment (TPA) procedure, and wherein the predetermined period corresponds to a sum of a preset period of time and a period of time obtained by subtracting a propagation delay time, occurring at a transmission from the destination node to the relay node, from a propagation delay time, occurring at a transmission from the destination node to the source node.

14. The method of claim 13, wherein the relay node operates by a half-duplex scheme to receive the data frame from the source node, and transmits the data frame to the destination node.

15. The method of claim 13, wherein the transmitting comprises setting a medium access control (MAC) address of the source node to a transmitter address of an MAC header, setting an MAC address of the destination node to a receiver address of the MAC header, and transmitting the data frame.

16. The method of claim 13, further comprising:
measuring a quality of a link between the source node and the relay node and a quality of a link between the relay node and the destination node; and
transmitting, to the source node, information about the quality of the link between the source node and the relay node and information about the quality of the link between the relay node and the destination node.

17. A method for wireless communication performed by a destination node, the method comprising:
receiving a data frame from a relay node and a source node in a second time interval after a first time interval; and
transmitting an acknowledgment frame indicating a reception of the data frame after a predetermined period within the second time interval to the source node,
wherein the second time interval is allocated after the first time interval,
wherein the source node transmits the data frame to the relay node in the first time internal from a start point of the first time interval,
wherein the destination node receives the data frame from the relay node and the source node after the predetermined period from a start point of the second time interval,
wherein among the source node, the relay node and the destination node perform a Transmission Time-Point Adjustment (TPA) procedure, and
wherein the predetermined period corresponds to a sum of a preset period of time and a period of time obtained by subtracting a propagation delay time, occurring at a transmission from the destination node to the relay node, from a propagation delay time, occurring at a transmission from the destination node to the source node.

* * * * *